United States Patent [19]

Zenios et al.

[11] Patent Number: 5,187,801

[45] Date of Patent: Feb. 16, 1993

[54] MASSIVELY-PARALLEL COMPUTER SYSTEM FOR GENERATING PATHS IN A BINOMIAL LATTICE

[75] Inventors: Stavros A. Zenios, Marlton, N.J.; James M. Hutchinson, Cambridge, Mass.

[73] Assignee: Thinking Machines Corporation, Cambridge, Mass.

[21] Appl. No.: 508,343

[22] Filed: Apr. 11, 1990

[51] Int. Cl.⁵ .................. G06F 15/20; G06F 15/31
[52] U.S. Cl. ................................ 395/800; 395/1; 364/DIG. 1; 364/918; 364/931; 364/931.01; 364/931.02; 364/931.03; 364/225; 364/228.7; 364/274
[58] Field of Search ............ 364/DIG. 1 MS File, 364/DIG. 2 MS File, 408, 400, 401, 402, 403, 404, 405, 406, 407; 395/1, 800

[56] References Cited

U.S. PATENT DOCUMENTS

| | | | |
|---|---|---|---|
| 4,598,400 | 1/1986 | Hillis | 370/60 |
| 4,648,037 | 3/1987 | Valentino | 364/408 |
| 4,648,038 | 3/1987 | Roberts et al. | 364/408 |
| 4,814,973 | 3/1989 | Hillis | 395/800 |
| 4,933,836 | 6/1990 | Tulpule et al. | 364/800 |
| 4,984,235 | 1/1991 | Hillis | 370/60 |

OTHER PUBLICATIONS

Ho et al., "Term Structure Movements and Pricing Interest Rate Contingent Claims", The Journal of Finance, vol. XLI, No. 5 (Dec. 1986), pp. 1011-1029.

*Primary Examiner*—Robert B. Harrell
*Attorney, Agent, or Firm*—Richard A. Jordan

[57] ABSTRACT

An interest rate scenario generation system generates a plurality of paths through a binomial lattice arrangement to facilitate generation of a like plurality of interest rate scenarios. The system includes a plurality of processing elements each for performing processing operations, communications links for enabling each of the processing elements to transmit data with at least one other processing element, and a control arrangement. The configuration control element logically establishes the processing elements in a plurality of rows and columns, each row being associated with a path through the binomial lattice used in generating an interest rate scenario, and successive columns being associated with successive steps through the binomial lattice arrangement. The configuration control element configures the rows to enable the processing elements to communicate with one other processing element in the respective row. A random number control element enables the processing elements to generate random numbers representative of successive links in the lattice. Finally, a path generator enables, during a plurality of successive iterations, the processing elements in each of the successive columns to receive path information from processing elements in the preceding column and generate updated path information in response to the received path information and to the random numbers generated thereby.

18 Claims, 3 Drawing Sheets

100 ESTABLISH SERIAL PROCESSORS AS TWO-DIMENSIONAL MATRIX WITH NUMBER OF ROWS AS NUMBER OF INTEREST RATE SCENARIOS AND NUMBER OF COLUMNS AS NUMBER OF PERIODS t

101 ENABLE SERIAL PROCESSORS TO GENERATE PATH LINK IDENTIFICATION VALUE

102 PERFORM SCAN-WITH-ADD OPERATION TO ENABLE SERIAL PROCESSORS TO GENERATE, IN PARALLEL, RESPECTIVE VALUES OF "j" FOR EACH SERIAL PROCESSOR

103 ENABLE SERIAL PROCESSORS TO, IN PARALLEL, DETERMINE INTEREST RATE VALUES USING RESPECTIVE VALUES OF "j"

FIG. 3

MASSIVELY-PARALLEL COMPUTER SYSTEM FOR GENERATING PATHS IN A BINOMIAL LATTICE

INCORPORATION BY REFERENCE

U.S. Pat. No. 4,598,400, issued Jul. 1, 1986, to W. Daniel Hillis, for Method and Apparatus For Routing Message Packets, and assigned to the assignee of the present application, incorporated herein by reference.

U.S. Pat. No. 4,814,973, issued Mar. 21, 1989, to W. Daniel Hillis, for Parallel Processor, and assigned to the assignee of the present application, incorporated herein by reference.

U.S. Pat. No. 4,984,235, issued Jan. 8, 1991, to W. Daniel Hillis, et al, for Method and Apparatus For Routing Message Packets, and assigned to the assignee of the present application, (hereinafter identified as "Hillis, et al., '235 patent) incorporated herein by reference.

FIELD OF THE INVENTION

The invention relates generally to the field of digital computer systems, and more particularly to financial business systems for studying and measuring the evolution of the term structure of interest rates.

BACKGROUND OF THE INVENTION

A computer system generally includes one or more processors, a memory and an input/output system. The memory stores data and instructions for processing the data. The processor(s) process the data in accordance with the instructions, and store the processed data in the memory. The input/output system facilitates loading of data and instructions into the system, and obtaining processed data from the system.

Most modern computer systems have been designed around a "von Neumann" paradigm, under which each processor has a program counter that identifies the location in the memory which contains its (the processor's) next instruction. During execution of an instruction, the processor increments the program counter to identify the location of the next instruction to be processed. Processors in such a system may share data and instructions; however, to avoid interfering with each other in an undesirable manner, such systems are typically configured so that the processors process separate instruction streams, that is, separate series of instructions, and sometimes complex procedures are provided to ensure that processors' access to the data is orderly.

In Von Neumann machines instructions in one instruction stream are used to process data in a single data stream. Such machines are typically referred to as SISD (single instruction/multiple data) machines if they have one processor, or MIMD (multiple instruction/multiple data) machines if they have multiple processors. In a number of types of computations, such as processing of arrays of data, the same instruction stream may be used to process data in a number of data streams. For these computations, SISD machines would iteratively perform the same operation or series of operations on the data in each data stream. Recently, single instruction/multiple data (SIMD) machines have been developed which process the data in all of the data streams in parallel. Since SIMD machine process all of the data streams in parallel, such problems can be processed much more quickly than in SISD machines, and at lower cost than with MIMD machines providing the same degree of parallelism.

The aforementioned Hillis patents, disclose an SIMD machine which includes a host computer, a micro-controller and an array of processing elements, each including a bit-serial processor and a memory. The host computer, inter alia, generates commands which are transmitted to the micro-controller. In response to a command, the micro-controller transmits one or more SIMD instructions to the array, each SIMD instruction enabling all of the processing elements to perform the same operation in connection with data stored in the elements' memories.

Digital computers are being used in a number of applications in business, accounting and financial analysis and modeling. See, for example, U.S. Pat. No. 4,648,037, issued Mar. 3, 1987, to Valentino, for Method and Apparatus For Benefit And Financial Communication (assigned to Metropolitan Life Insurance Co.), and U.S. Pat. No. 4,648,038, issued Mar. 3, 1987, to Roberts, et al., for Methods and Apparatus For Restructuring Debt Obligations (assigned to Lazard Freres & Co.).

Models for studying or measuring the evolution of the term structure of interest rates are of central interest in financial modeling applications. Several different systems have been developed for this purpose. One such system involves adaptation of the Monte Carlo simulation method of a diffusion process. A second system involves construction of a binomial lattice. In generating such term structures, it is desirable to generate a large number of interest rate scenarios for use in generating a number of financial models.

SUMMARY OF THE INVENTION

The invention provides a new and improved massively-parallel computer system for generating paths in a binomial lattice. The paths may be used in generating, in parallel, a plurality of interest rate scenarios that may be used in financial modeling applications.

In brief summary, the interest rate scenario generation system generates a plurality of paths through a binomial lattice arrangement to facilitate generation of a like plurality of interest rate scenarios. The system includes a plurality of processing elements each for performing processing operations, communications links for enabling each of the processing elements to transmit data with at least one other processing element, and a control arrangement. The configuration control element logically establishes the processing elements in a plurality of rows and columns, each row being associated with a path through the binomial lattice used in generating an interest rate scenario, and successive columns being associated with successive steps through the binomial lattice arrangement. The configuration control element configures the respective processing elements to communicate with one other processing element in the respective row. A random number control element enables the processing elements to generate random numbers representative of successive links in the lattice. Finally, a path generator enables, during a plurality of successive iterations, the processing elements in each of the successive columns to receive path information from processing elements in the preceding column and generate updated path information in response to the received path information and to the random numbers generated thereby.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 3 is a flow chart helpful in understanding the operation of the interest rate scenario generation system, using the massively-parallel computer shown in FIG. 1.

DETAILED DESCRIPTION OF AN ILLUSTRATIVE EMBODIMENT

Figure 1:
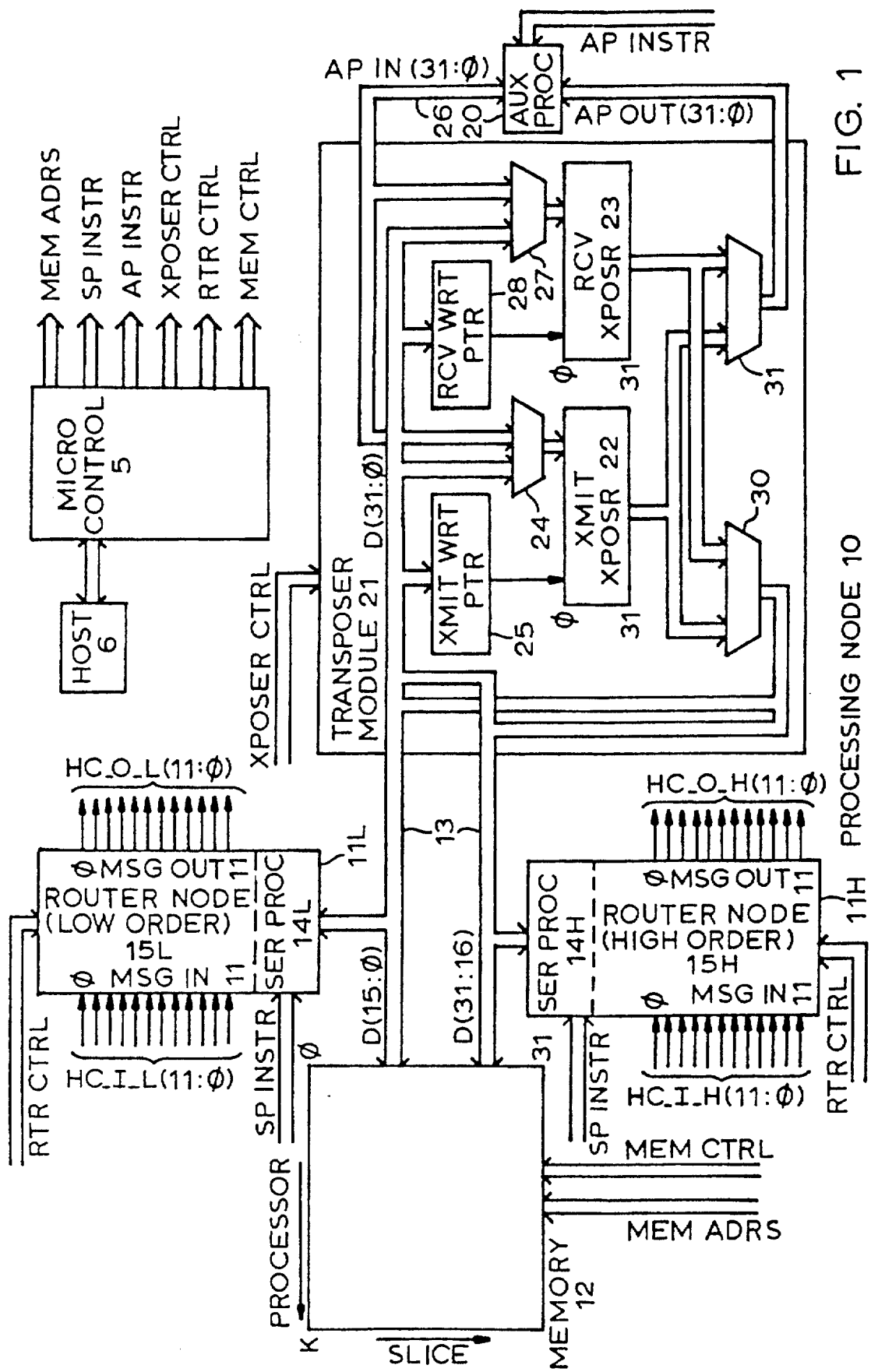
FIG. 1 is a block diagram of a portion of a massively-parallel computer in which the invention may be used.

The inventive massively-parallel computer system for generating paths in a binomial lattice will be described in terms of a system for generating, in parallel, a plurality of interest rate scenarios that may be used in financial modeling applications. Before proceeding to a description of the interest rate scenario generation system in accordance with the invention, it would be helpful to describe a massively parallel computer which may be used in the inventive system. FIG. 1 is a block diagram of a portion of such as massively parallel computer. The computer system includes a micro-controller 5, which is controlled by a host 6 and which, in turn, controls an array of processing nodes, one of which, namely, processing node 10, is shown in FIG. 1. To accomplish processing, the host computer 6 transmits commands to the micro-controller 5. In response to a command, the micro-controller 5 may transmit one or more instructions or other sets of control signals which control processing and other operations, in parallel, to all of the processing nodes concurrently. In addition, a number of processing nodes 10 are interconnected, as described in the aforementioned Hillis patents, to facilitate the transfer of data among the processing nodes 10.

With reference to FIG. 1, processing node 10 includes two processing element (PE) chips 11H and 11L (generally identified by reference numeral 11) connected to a memory 12 over a data bus 13. In one embodiment, the data bus includes thirty-two data lines D(31:0) which are divided into high-order data lines D(31:16), which connect to PE chip 11H, and low-order data lines D(15:0), which connect to PE chip 11L. Each PE chip 11 includes a set of serial processors, generally identified by reference numeral 14, and a router node, generally identified by reference numeral 15. The serial processors operate in response to SP INSTR serial processor instruction signals from the micro-controller 5 to perform processing on data stored in the memory 12. The memory 12 operates in response to MEM ADRS memory address signals, which identify storage locations in the memory 12, and MEM CTRL memory control signals which indicate whether data is to be stored in or transmitted from the location identified by the MEM ADRS memory address signals. Both the MEM ADRS memory address signals and the MEM CTRL memory control signals are provided by the micro-controller 5. The router nodes 15 also operate in response to RTR CTRL router control signals, also from the micro-controller 5, to transmit messages containing data from one processing node 10 to another.

In one embodiment, each PE chip 11 includes sixteen serial processors 14, each of which is associated with one of the data lines of the data bus 13. That is, each serial processor 14 receives data bits from, and transmits data bits onto, one of the data lines D(i) ["i" is an integer from the set (31, . . . ,0)]. The memory 12 has storage locations organized into thirty-two bit slices, with each slice being identified by a particular binary-encoded value of the MEM ADRS memory address signals from the micro-controller 5. If data is to be transmitted from a slice in memory identified by a particular value of the MEM ADRS memory address signals, the memory 12 will transmit bits 31 through 0 of the slice onto data lines D(31) through D(0), respectively. On the other hand, if data is to be loaded into a slice in memory identified by a particular value of the MEM ADRS memory address signals, the memory 12 will receive bits 31 through 0 of from data lines D(31) through D(0), respectively, and load them into respective bits of the slice.

To perform processing on multi-bit words of data in the memory 12 using the serial processors 14, the micro-controller 5 iteratively generates MEM ADRS memory address signals whose values identify successive location in memory 12, and MEM CTRL memory control signals which enable the memory 12 to transmit or store slices of data, and SP INSTR serial processor instruction signals which enable the serial processors 14 to perform the required operations on the bits on their associated data lines D(i). The data in the memory 12 thus may be viewed in two ways, namely, (i) a slice view, identified by the arrow labeled "SLICE," representing fixed-size words of data ("data slices") that will be transmitted from the memory onto the data bus 13, or that will be received by the memory from the data bus 13, at one time in response to the MEM ADRS memory address signals, and (ii) a processor view, identified by the arrow labelled "PROCESSOR," which represents the organization in memory 12 of data which may be accessed by an individual serial processor.

The serial processors 14 can transmit data to each other over two communications mechanisms. One mechanism enables each serial processor to selectively transmit data to one of its four nearest-neighbor serial processors. The second mechanism, a global router interconnecting processing nodes in a hypercube, enables any serial processor to transmit data to any other serial processor in the system. In the first mechanism, termed "NEWS" (for the North, East, West, and South directions in which a processing element may transmit data), the micro-controller enables all of the processing elements to transmit, and to receive, bit-serial data in unison, from the selected neighbor.

In the hypercube communications mechanism, the router nodes 15 of all of the processing nodes are interconnected to facilitate transfer of information among the processing nodes 10 comprising the array. In one embodiment, the router nodes 15 can also be used to transfer information among processing nodes 10 to implement the NEWS information transfer mechanism therebetween. For the non-NEWS information mechanism, the router nodes 15 transmit information in the form of messages. Each message includes an address to identify a processing node 10 and serial processor 14 that is the intended recipient of the message, and data. In one particular embodiment the router nodes are interconnected in the form of a hypercube, as described in the aforementioned Hillis patents. Each router node 15H and 15L, under control of RTR CTRL router control signals from the microcontroller 5, transmits messages to other router nodes 15 on other processing element chips 11 over a plurality of communications links identified by reference numerals HC_O_H(11:0) and HC_O_L(11:0), respectively.

In addition, each router node 15H and 15L receives messages from communications links identified by reference numerals HC_I_H(11:0) and HC_I_L(11:0), respectively. The router nodes 15 determine from the address of each received message whether the message is intended for a serial processor 14 on the processing node 10 and, if so, couples it onto a data line D(i) of data bus 13 over which the serial processor 14 that is to receive the message accesses the memory 12. The micro-controller 13 generates MEM ADRS memory address and MEM CTRL memory control signals to facilitate the storage of the data from the message in the memory 12.

The various communications links HC_O_H(11:0), HC_O_L(11:0), HC_I_H(11:0) and HC_I_L(11:0), connected to each processing node 10 are connected to diverse ones of other processing nodes in a conventional manner to effect the hypercube interconnection. Thus, the outgoing communications links identified by reference numerals HC_O_H(11:0) and HC_O_L(11:0) correspond to various incoming communications links, which may be identified by reference numerals HC_I_H(11:0) and HC_I_L(11:0), at router nodes 15 of other processing nodes 10. In one embodiment, the circuitry of the router nodes 15H and 15L is similar to that described in the aforementioned Hillis patents.

The processing nodes 10 may also have an auxiliary processor 20 that processes data in memory 12 that may be organized either in slice format or in processor format, and a transposer module 21 to interface the auxiliary processor 20 to the data bus 13. The auxiliary processor 20 may be, for example, a floating point processor, which may perform arithmetic and logic operations in connection with data in floating point data format. The auxiliary processors 20 and transposer modules 21 in the various processing nodes 10 operate in response to AP INSTR auxiliary processor instruction signals and XPOSER CTRL transposer control signals, respectively, from the micro-controller 5. As is the case with the other control signals provided by the micro-controller 5, the micro-controller 5 transmits the AP INSTR auxiliary processor instruction signals and the XPOSER CTRL transposer control signals to control the auxiliary processor 20 and transposer module 21 of all of the processing nodes 10 concurrently, enabling them to generally perform the same operation concurrently.

The transposer module 21 includes several transposer circuits, two of which, identified by reference numerals 22 and 23, are shown in FIG. 1. Transposer 22 receives input data from an input multiplexer 24 and stores it in one of a plurality of slots identified by the contents of a write pointer register 25. The register 25 may be provided with a pointer prior to storing each item of data in a slot in the transposer 22. Alternatively, the register may be loaded with an initial value before loading any data in the transposer 22 and then incremented for each successive item of data loaded therein. The input multiplexer 24, under control of the XPOSER CTRL transposer control signals, selectively couples data signals to the transposer 22 from either the data bus 13 or from a bus 26. Bus 26 carries AP IN (31:0) auxiliary processor in signals representing processed data from the auxiliary processor 20. The transposer module 21 also includes an input multiplexer 27 and write pointer register 28 which selectively controls storage of data in the transposer 23 in the same manner.

The transposers 22 and 23 operate in response to the XPOSER CTRL transposer control signals to generate transpositions of the data stored therein. The transposer module 21 also includes two output multiplexers 30 and 31, also controlled by the XPOSER CTRL transposer control signals, which control the transfer of transposed data onto a bus 32 for transmission to the auxiliary processor 20 or onto the data bus 13 for transmission to the memory 12 or to the PE chips 11. Multiplexer 30 receives data signals from the output terminals of transposers 22 and 23 and selectively couples the signals from one of the transposers onto the data bus 13. Similarly, the multiplexer 31 receives data signals from the output terminals of transposer 23 and selectively couples the signals from one of the transposers onto the bus 32 for transmission to the auxiliary processor.

Although not shown in FIG. 1, the processing node 10 may also provide a direct (that is, non-transposing) path between the data bus 13 and the auxiliary processor 20. It will be appreciated that the transposer module 21 facilitates the transposition of data stored in the memory 12 in processor format, which would be transmitted serially over separate lines of the data bus 13, into parallel format for processing by the auxiliary processor 20. If the data is stored in memory 12 in slice format, transposition is not required. In addition, the transposer module 21 receives processed data from the auxiliary processor 20 and, if it is required that it be stored in the memory 12 in processor format, transposes the data for transmission serially over predetermined lines of the data bus 13. If the processed data from the auxiliary processor 20 is to be stored in the memory 12 in slice format, the data may be transmitted by the auxiliary processor 20 to the memory 12 over the non-transposing path.

Figure 2:
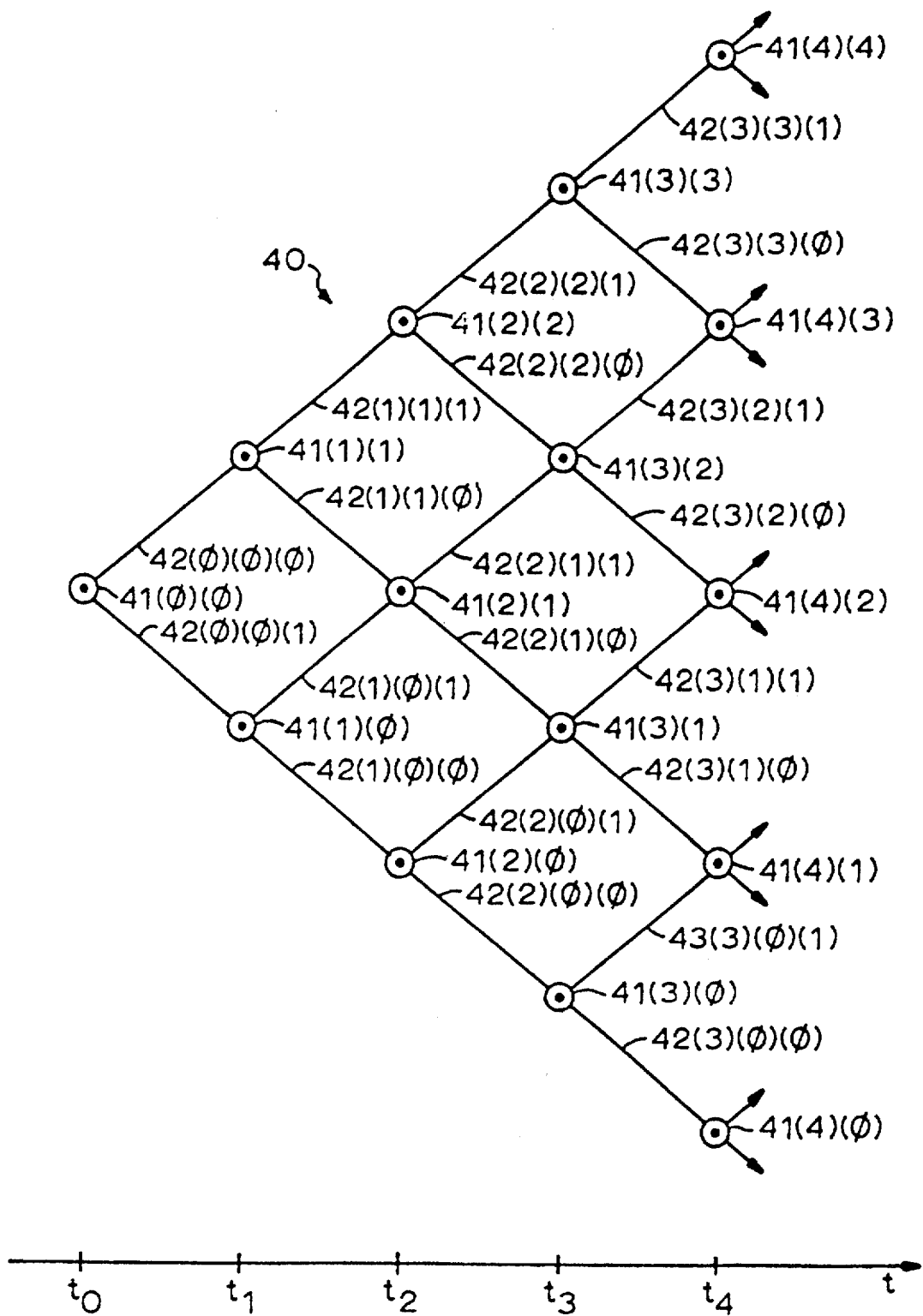
FIG. 2 is a diagram depicting a binomial lattice, which may be helpful in explaining the inventive interest rate scenario generation system.

With this background, an interest rate scenario generating system, using the massively parallel computer described above in connection with FIG. 1, will be described in connection with FIGS. 2 and 3. With reference to FIG. 2, the interest rate scenario generating system makes use of a "binomial lattice" 40. A binomial lattice 40 includes a plurality of nodes, generally identified by reference numeral 41(i)(j), extending from an origin node 41(0)(0). The nodes 41(i)(j) are interconnected by paths generally identified by reference numeral 42(i)(j)(k) (where "k" can have the values "0" or "1"). From each node 41(i)(j), at time $t_i$, the lattice permits traveling along two paths 42(i)(j)(k) ("k" can equal "0" or "1") to two nodes 41(i+1)(j+k) at time $t_{i+1}$. In addition, each node 41(i)(j), other than the origin node 41(0)(0), is reached from one of either one or two nodes 41(i−1)(j−k), from time $t_{i−1}$. It will be appreciated that, two paths may be used to traverse from one node 41(i)(j) to another node 41(i+2)(j+1) at time $t_{i+2}$ later (unless the node 41(i+2)(j) lies along an edge of the lattice), namely, (1) path 42(i)(j)(0) to node 41(i+1)(j), followed by path 42(i+1)(j)(1) to node 41(i+2)(j+1), and (2) path 42(i)(j)(1) to node 41(i+1)(j+1), followed by path 42(i+2)(j+1)(0) to node 41(i+1)(j+1).

Generally, the binomial lattice 40 is used in generating interest rates at different times "$t_i$" after the time $t_0$ represented by the origin node 41(0)(0) using the relation:

$$r_{tw} = r_{t0}k_t^w \quad \text{(EQN 1)}$$

where "r" is the interest rate at time "$t_i$", "$k_t$" is a constant and the value of "w" identifies a state in the interest rate scenario. The values for "$r_{t0}$" and "$k_t$" for an interest rate scenario can be generated using known techniques. Valid paths for an interest rate scenario are generated through the binomial lattice 40, from the beginning time $t_0$ represented by the origin node 41(0)(0) to a later time $t_n$, which is represented by one of the nodes 41(n)(j) for each path. Using the binomial lattice, for each path and for each time period $t_i$ the value of "w" for equation EQN 1 is determined to be the value of "j" of the node 41(i)(j).

The operations performed, using the massively parallel computer described in connection with FIG. 1, in developing, in parallel, paths through the binomial lattice 40 defining a plurality of interest rate scenarios, are depicted in the flow chart of FIG. 3. The host 6, through the micro-controller 5, logically organizes the serial processors 14 comprising the computer in a two-dimensional matrix comprising a plurality of rows and columns (step 100). Each row is associated with a different interest rate scenario, and the successive columns are associated with successive time periods $t_i$. Organizing the serial processors 14 into a two-dimensional matrix allows them to transmit data to each other using the two-dimensional NEWS mechanism described above.

After organizing the serial processors 14 in a two-dimensional matrix, the host 6, through the micro-controller 5, enables the serial processors 14, in parallel, to generate one of the values one or zero (step 101). It will be appreciated that the values one and zero correspond to values that can be taken on by the index (k) in the reference numerals for path links 42(i)(j)(k). The generation of the values by the serial processors 14 in the matrix can have any particular pattern. In one embodiment, the values are generated at random, so that the serial processors 14 that generate either value one or value zero at random.

In another embodiment, the serial processors 14 in the first columns in each row generate the values one or zero that corresponds to the binary identifier for the row in the matrix. Thus, for example, if the matrix has 1024 ($2^{10}$) rows, the row identifiers will have ten bits that have bit patterns that extend from "0000000000" to "1111111111." In that case, the serial processors in the first ten columns in each row generate values one or zero that, across those serial processors, have the pattern corresponding to the row's ten-bit binary row identifier. Generating the values one and zero in this manner ensures that the paths will all be different, without loss of generality. The serial processors 14 in the other columns may generate values one or zero at random.

As noted above, the values generated in step 101 correspond to the identifiers of links 42(i)(j)(k) defining the respective paths for the interest rate scenarios. Thereafter, the host 6, through the micro-controller 5, enables the serial processors 14 to, in parallel, generate the node identifications "j" for each time period "$t_i$" (step 102). The results, in each row in the matrix, are the values for "j" that identify the sequence of nodes 41(i)(j) in the path defining the respective interest rate scenario. The result "j" also provides the value for "w" that can be used in processing equation EQN 1, as described below.

In performing step 102, the host 6, through the micro-controller 5, enables the serial processors to perform a SCAN-WITH-ADD operation to determine the respective node identifications "j" for each time period "$t_i$". Generally, a SCAN-WITH-ADD operation, produces at each serial processor 14 in a row of the matrix the correct sums of the values generated in step 101, from the first serial processor 14 of the row up to the serial processor 14.

The scan operation uses a tree-structured algorithm relying on the associative property of addition. Alternatively, step 102 can be performed by performing an "add with propagate" operation, in parallel in a series of iterations along the rows of the matrix. In that operation, in the rows in parallel, beginning with the serial processor 14 in the first column, the serial processor transmits the value it generated in step 101 to the serial processor in the next column using the NEWS mechanism. The receiving serial processor can adds the received value to the value that it generated, store the result (which corresponds to "j"), and pass the result to the serial processor 14 in the next column in the next iteration. After iterations have been performed over all columns of the matrix, each serial processor 14 in the matrix has the required value of "j".

It will be appreciated that the results maintained by the serial processors 14 in the successive columns in each row in the serial processor matrix in step 102 comprise the indices "j" of the nodes 41(i)(j) for the successive time periods $t_i$ for each interest rate scenario, which correspond to the states "w" in EQN 1 above (step 103). After generating the various paths for the interest rate scenarios, the host 6 may enable the serial processors 14 to determine the interest rates "$r_{tw}$" for the various scenarios. In that operation, the host 6 may enable the value for "$k_t$" to be transmitted to the serial processors, and the serial processors to perform the necessary multiplications to obtain "$k_t^w$". Thereafter, the host 6 may enable the value "$r_{t0}$" to be broadcast to the serial processors for the multiplication to produce "$r_{tw}$".

It will be appreciated that, while the interest rate scenario generation system has been described in connection with use of the serial processors 14, the system could make use of the auxiliary processors 20 in a manner similar to that described above in connection with the serial processors. In that connection, the host 6 would establish the auxiliary processors as a two-dimensional matrix of rows and columns, as described above, and would enable the SCAN-WITH-ADD operation as described above.

The invention provides a number of benefits. It facilitates the generation of a number of interest rate scenarios quickly and easily, using a number of processors operating in parallel. Since generation of interest rate scenarios is often the foundation of financial modeling applications, speedy generation of such scenarios provides enhanced processing of such applications.

Further, while the invention has been described in terms of generating interest rate scenarios, it may also be used in processing binomial lattices 40 (FIG. 12) to generate paths therethrough for other purposes.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A massively-parallel computer system for generating in parallel a plurality of paths through a binomial lattice arrangement, each binomial lattice being represented by a plurality of lattice nodes connected by path links to form a tree structure from an origin node, each path defining a sequence of path links from the origin node along a selected path link through one lattice node in each level below the origin node in the binomial lattice arrangement, said system comprising:
   A. a plurality of processing elements each for performing processing operations in accordance with control signals,
   B. an interconnection network connected to said processing elements for facilitating the transfer of data among the processing elements; and
   C. a control arrangement for controlling the processing elements and said interconnection network comprising:
      i. a configuration control elements for controlling the interconnection network to logically establish the processing elements in a two-dimensional array comprising a plurality of rows and columns, the processing elements in each row being associated with sequential ones of the lattice nodes in a path through a binomial lattice arrangement;
      ii. a path link generator control element for enabling the processing elements to, in parallel, generate, a path link identifier value identifying a path link from the lattice node associated with the processing element to a lattice node associated with a successive processing element in the binomial lattice arrangement; and
      iii. a path generator element for enabling the processing elements, in parallel among the respective rows, to, within each row, generate from path link identifiers which they generated in response to the path link generator control element, lattice node identifiers, the processing elements in successive columns of each row established by said configuration control element generating a sequence of lattice node identifiers identifying sequential lattice nodes in a path in the binomial lattice.

2. The massively parallel computer system as defined in claim 1 in which said path generator element enables the processing elements in each row to perform a scan-with-add operation in connection with the path link identifiers to thereby generate the respective lattice node identifiers.

3. The massively parallel computer system as defined in claim 1 in which said path generator element enables the processing elements in each row to perform an add-with-propagate operation in connection with the path link identifiers to thereby generate the respective lattice node identifiers.

4. The massively parallel computer system as defined in claim 1 in which said path generator element enables the processing elements to transfer their respective path length identifiers thereamong in each row as data over the interconnection network to facilitate the generation of the lattice node identifiers.

5. The massively parallel computer system as defined in claim 1 in which said path link generator control element enables the processing elements to generate random numbers as the path length identifier values.

6. The massively parallel computer system as defined in claim 1 in which each row has a row identifier and said path link generator control element enables selected processing elements in each row to use the row identifier in generating the path identifier values.

7. A control arrangement for controlling a massively-parallel computer system to generate in parallel a plurality of paths through a binomial lattice arrangement, each binomial lattice being represented by a plurality of lattice nodes connected by path links to form a tree structure from an origin node, each path defining a sequence of path links from the origin node along a selected path link through one lattice node in each level below the origin node in the binomial lattice arrangement, said system comprising a plurality of processing elements each for performing processing operations in accordance with control signals and an interconnection network connected to said processing elements for facilitating the transfer of data among the processing elements, the control arrangement for controlling the processing elements and said interconnection network comprising:
   A. a configuration control element for controlling the interconnection network to logically establish the processing elements in a two-dimensional array comprising a plurality of rows and columns, the processing elements in each row being associated with sequential ones of the lattice nodes in a path through a binomial lattice arrangement;
   B. a path link generator control element for enabling the processing elements to, in parallel, generate a path link identifying a path link from the lattice node associated with the processing element to a lattice node associated with a successive processing element in the binomial lattice arrangement; and
   C. a path generator element for enabling the processing elements, in parallel among the respective rows to, within each row, generate from path link identifiers which they generated in response to path link generator control element, lattice node identifiers, the processing elements in successive columns of each row established by said configuration control element generating a sequence of lattice node identifiers identifying sequential lattice nodes in a path in the binomial lattice.

8. The massively parallel computer systems as defined in claim 7 in which said path generator element enables the processing elements in each row to perform a scan-with-add operation in connection with the path link identifiers to thereby generate the respective lattice node identifiers.

9. The massively parallel computer system as defined in claim 7 in which said path generator element enables the processing elements in each row to perform an add-with-propagate operation in connection with the path link identifiers to thereby generate the respective lattice node identifiers.

10. The massively parallel computer system as defined in claim 7 in which said path generator element enables the processing elements to transfer their respective path length identifiers thereamong in each row as data over the interconnection network to facilitate the generation of the lattice node identifiers.

11. The massive parallel computer system as defined in claim 7 in which said path link generator control element enables the processing elements to generate random numbers as the path length identifier values.

12. The massively parallel computer system as defined in claim 7 in which each row has a row identifier and said path link generator control element enables selected processing elements in each row to use the row identifier in generating the path identifier values.

13. A method for controlling a massively-parallel computer system to generate in parallel a plurality of paths through a binomial lattice arrangement, each binomial lattice being represented by a plurality of lattice nodes connected by path links to form a tree structure from an origin node, each path defining a sequence of path links from the origin node along a selected path link through one lattice node in each level below the origin node in the binomial lattice arrangement, said massively-parallel computer system comprising a plurality of processing elements each for performing processing operations and an interconnection network connected to said processing elements for facilitating the transfer of data among the processing elements, the method comprising the steps of:

A. controlling the interconnection network to logically establish the processing elements in a two-dimensional array comprising a plurality of rows and columns, the processing elements in each row being associated with sequential ones of the lattice nodes in a path through a binomial lattice arrangement;

B. enabling the processing elements to, in parallel, generate a path link identifier value identifying a path link from the lattice node associated with the processing element to a lattice node associated with a successive processing element in the binomial lattice arrangement; and C. enabling the processing elements, in parallel among the respective rows to, within each row, generate from path link identifiers which they generated in response to a random number control element, lattice node identifiers, the processing elements in successive columns of each row established by a configuration control element generating a sequence of lattice node identifiers identifying sequential lattice nodes in a path in the binomial lattice.

14. The method as defined in claim 13 in which the path generation step comprises the step of enabling the processing elements in each row to perform a scan-with-add operation in connection with the path link identifiers to thereby generate the respective lattice node identifiers.

15. The method as defined in claim 13 in which said path generation step comprises the step of enabling the processing elements in each row to perform an add-with-propagate operation in connection with the path link identifiers to thereby generate the respective lattice node identifiers.

16. The method as defined in claim 13 in which the path generation step includes the step of enabling the processing elements to transfer their respective path length identifiers thereamong in each row as data over the interconnection network to facilitate the generation of the lattice node identifiers.

17. The method as defined in claim 13 in which the path link generation step comprises the step of enabling the processing elements to generate random numbers as the path length identifier values.

18. The method as defined in claim 13 in which each row has a row identifier and the path link generation step includes the step of enabling selected processing elements in each row to use the row identifier in generating the path identifier values.

* * * * *